United States Patent
Raffaele et al.

(10) Patent No.: US 7,210,397 B2
(45) Date of Patent: May 1, 2007

(54) SCOTCH YOKE ENGINE

(76) Inventors: Peter Robert Raffaele, 24 Carlow Crescent, Killarney Heights, New South Wales 2087 (AU); Michael John Raffaele, 24 Carlow Crescent, Killarney Heights, New South Wales 2087 (AU)

(*) Notice: Subject to any disclaimer, the term of this patent is extended or adjusted under 35 U.S.C. 154(b) by 0 days.

(21) Appl. No.: 11/362,249

(22) Filed: Feb. 24, 2006

(65) Prior Publication Data

US 2006/0137520 A1    Jun. 29, 2006

Related U.S. Application Data

(63) Continuation of application No. 10/476,126, filed as application No. PCT/AU02/00535 on Apr. 29, 2002, now abandoned.

(30) Foreign Application Priority Data

Apr. 27, 2001 (AU) ..................... PR4595

(51) Int. Cl.
*F01B 9/00* (2006.01)
(52) U.S. Cl. ...................... 92/140; 92/165 R
(58) Field of Classification Search ............ 92/140, 92/165 R
See application file for complete search history.

(56) References Cited

U.S. PATENT DOCUMENTS

| 1,349,660 A | 8/1920 | Buhl |
| 1,987,661 A | 1/1935 | Blauvelt et al. |

(Continued)

FOREIGN PATENT DOCUMENTS

| DE | 2361228 | 6/1975 |
| DE | 3624753 A1 | 10/1987 |
| DE | 4408646 A1 | 9/1994 |

(Continued)

OTHER PUBLICATIONS

Article: CKE's Radial Engine, based on Kmicikiewicz U.S. Appl. No. 4,727,794, printed from internet web page at http:\\www.cke-tech.com.RE.htm and Dwg SK-076, Kinematics and Dynamics of CKE's Radial Engine compared to conventional mechanisms con Scotch-Yoke, based on Kmicikiewicz U.S. Appl. No. 4,727,794, printed from internet web page at http:\\www.cke-tech.com.SK-076.htm.

(Continued)

*Primary Examiner*—Michael Leslie
(74) *Attorney, Agent, or Firm*—Greenberg Traurig LLP (57) ABSTRACT

A scotch yoke type fluid device where the or each piston (32) has its own slider (18) and its own pair of sliding surfaces (30) disposed on the same side of the big end bearing (16) of the crank (12). The main crank axis (14) is movable along a path such that the pistons are neither substantially retarded nor advanced. The effective centre of mass of the crank, piston and slider remains stationary relative to the crank axis. Guide means (2030) constrain each piston to move along its piston axis. The guide means is transverse of the sliding surfaces (30) and engages crankcase mounted guides. An intermediate member may interconnect the piston and the slides capable of adjusting the intermediate member to change the compression ratio. For a device having opposed pistons, the yoke (6060) attached to the two pistons is split into two parts (6062a, 6062b) releasably held together.

16 Claims, 12 Drawing Sheets

U.S. PATENT DOCUMENTS

| | | | |
|---|---|---|---|
| 3,258,992 A | 7/1966 | Hittell | |
| 4,013,048 A | 3/1977 | Reitz | |
| 4,124,002 A | 11/1978 | Crise | |
| 4,173,151 A | 11/1979 | Grundy | |
| 4,184,817 A | 1/1980 | Pareja | |
| 4,331,108 A | 5/1982 | Collins | |
| 4,584,972 A | 4/1986 | Jayne et al. | |
| 4,598,672 A | 7/1986 | Jayne et al. | |
| 4,683,809 A | 8/1987 | Taylor | |
| 4,694,785 A | 9/1987 | Timmerman et al. | |
| 4,715,336 A | 12/1987 | Schindler et al. | |
| 4,727,794 A | 3/1988 | Kmicikiewicz | |
| 4,738,230 A | 4/1988 | Johnson | |
| 4,751,871 A | 6/1988 | Burghardt et al. | |
| 4,776,310 A | 10/1988 | Gray | |
| 4,791,898 A | 12/1988 | Jayne | |
| 4,825,820 A | 5/1989 | Morgan | |
| 4,884,536 A | 12/1989 | Neale et al. | |
| 4,941,669 A * | 7/1990 | Fujisawa et al. | 277/444 |
| 5,327,863 A | 7/1994 | Downton et al. | |
| 5,402,755 A | 4/1995 | Waissi | |
| 5,431,130 A | 7/1995 | Brackett | |
| 5,503,038 A | 4/1996 | Aquino et al. | |
| 5,755,192 A | 5/1998 | Brevick | |
| 5,791,302 A | 8/1998 | Ma | |
| 5,873,339 A | 2/1999 | Isogai | |
| 6,029,346 A | 2/2000 | Chellappa | |

FOREIGN PATENT DOCUMENTS

| | | |
|---|---|---|
| DE | 19500854 A1 | 7/1995 |
| DE | 19725227 A1 | 1/1998 |
| EP | 0187930 | 7/1986 |
| EP | 0241243 A2 | 10/1987 |
| FR | 2438746 | 5/1980 |
| GB | 200704 | 7/1923 |
| GB | 678677 | 9/1952 |
| JP | 61253335 A | 11/1986 |
| JP | 08100621 A | 4/1996 |
| JP | 3271530 | 10/1997 |
| JP | 8014061 | 1/1998 |
| JP | 10008975 | 1/1998 |
| JP | 10054255 A | 2/1998 |
| JP | 10331940 A | 12/1998 |
| RU | 2094627 C | 10/1997 |
| SU | 1281700 A | 1/1987 |
| TW | 251333 A | 7/1994 |
| WO | WO 90/06426 | 6/1990 |
| WO | WO 94/15080/WIPO | 7/1994 |
| WO | WO 97/32647 | 9/1997 |
| WO | WO 97/36096 | 10/1997 |
| WO | WO 00/60216 A | 10/2000 |
| WO | WO 01/50037 | 7/2001 |

OTHER PUBLICATIONS

Article: The Collins Scotch Yoke Engine as a Compac[t] Alternative—A Theoretical Comparison o[f] Features of Scotch Yoke and Conventional Engine[s], Hans G. Rosenkra[nz] CMC Research Pty. and Harry C. Wats[on] Univeristy of Melbourne; probable date of publication between Aug. 1994 and Apr. 4, 1995, in view of information and acknowledgement.

Some Unusual Engines, pp. 124-127, by L.J.K. Setright, published in 1975 by Mechanical Engineering Publications Limited (ISBN 0852982089).

"Technology Transfer", Aerospace Technology Innovation, Jul./Aug. 1997; vol. 5, No. 4.

* cited by examiner

SCOTCH YOKE ENGINE

This application is a continuation of, and claims priority of the filing date of, U.S. Ser. No. 10/476,126 file Jun. 10, 2004, now abandoned, which was a filing under 35 U.S.C. 371 of PCT/AU02/00535, filed 29 Apr. 2002.

BACKGROUND OF THE INVENTION

1. The Technical Field

This invention relates to improvements in engines and in engine components. The invention particularly relates to engines of the scotch yoke type and to components therefor.

2. The Prior Art

In a first aspect, the present invention deals with a development of an aspect of one of the inventions disclosed in International Patent Application No. PCT/AU00/00281. The invention in that disclosure related to a fluid device which included a crank having a big end with its axis orbiting around a main axis. Connecting means was rotatably mounted on the big end axis. At least one piston, being mounted for reciprocal motion in a cylinder along a piston axis, had piston guide means engaging engagement means on the connecting means. Also included was at least one restricting means for constraining the piston to move along the piston axis. In a preferred embodiment, as the crank mechanism rotated, the restricting means extended into the swept volume of the crank, projected along the main axis of the crank.

In the original invention as disclosed in PCT/AU00/00281, the piston guide means was commonly a surface which slidably engaged another surface, often complementary, on the connecting means. The restraining means was conveniently parallel to the piston axis and was described as extending into the swept volume of the crank mechanism, at least when the piston was at bottom dead center.

In a second aspect, the present invention deals with the manufacture of components suitable for use in connection with the scotch yoke devices in PCT/AU00/00281, as well as other forms of scotch yoke engine, and also in connection with the first aspect of the present invention.

It is possible to make the components of the inventions referred to from traditional materials, especially, in many cases, aluminum alloy. However, more recently inventions have been made with a view to manufacturing pistons from carbon-carbon material. There are significant advantages in that carbon-carbon components can have a higher melting point than aluminum alloy, for example and may retain room temperature strength to higher temperatures. They can be made lighter than aluminum components and have an extremely low co-efficient of thermal expansion.

Imported herein by reference is the content of the following US patent specifications dealing with carbon-carbon technology: U.S. Pat. Nos. 4,683,809, 4,909,133, 5,900,193 and 6,029,346 and 6,148,785.

U.S. Pat. No. 4,683,809 is concerned with the manufacture of a carbon-carbon piston involving inserting precursor fibers in a mat or random fiber orientation in a closed die, pyrolizing the precursor fibers, impregnating them with a carbonaceous resin system, stretching the precursor fiber prior to or during stabilization, stabilizing the material by heating the fiber in air, carbonizing the material by slowly heating the fiber in an inert atmosphere and graphitizing the fibers by raising the temperature to a desired beat treatment temperature. The piston can be fitted to a cylinder by lapping so as to precisely fit the bore of the cylinder. The piston may be constructed without piston grooves and without reinforcing material. The piston crown area may be reinforced with unidirectional fibers or cloth.

U.S. Pat. No. 4,909,133 discloses an improvement over the invention in U.S. Pat. No. 4,683,809, in which the crown, side wall, skirt and inner surfaces of the piston are armed by a one piece, closed end, single knitted fiber structural shape. It is claimed that a knitted fiber architecture, which enables the fiber directions to be controllable, results in increased strength properties, compared to cloth or mat.

U.S. Pat. No. 5,900,193 is concerned with a method of making carbon-carbon composite pistons by stacking carbon fiber laminae, prepregnated with a carbonaceous resin, over male mandrels to form a laminated composite billet, compressing female mandrels into the laminated composite billet to form a mould assembly, heating the laminated composite billet in the mould assembly to cure the carbonaceous resin, pyrolizing the composite billet to carbonize it, reimpregnating the carbonized composite billet with additional carbonaceous resin, repyrolizing to further density the billet and coring piston blanks, each with a crown and complete piston skirt surface, from the densified billet. The machined blanks can then be machined to final dimensions. The carbon fiber laminae may be woven carbon fabrics, unidirectional car fibers or directionally oriented to tailor structural and thermal properties. Optionally, ring grooves may be machined into the pistons. As an additional option, the crown and skirt surfaces of the piston blanks may be sealed, for example, with a ceramic coating or a metallic coating.

Further modifications are disclosed in U.S. Pat. No. 6,029,346.

Still further modifications are disclosed in U.S. Pat. No. 6,148,785.

The second aspect of this invention is concerned with improvements in making components of scotch yoke devices, including those disclosed in PCT/AU00/00281. In one particular aspect, the present invention is concerned with making a combined piston and connecting rod or connecting means using carbon-carbon composite or other fiber composite.

SUMMARY OF THE INVENTION

In relation to the first aspect of the invention, it has now been found that it is advantageous and possible to design the fluid engine so that the restraining means can extend into the swept volume of the crank mechanism, even when the piston is at top dead center.

The restraining means will usually engage a complementary constraining means, usually mounted on the crank case. In the present invention, these constraining means may extend into the swept volume of the crank mechanism. In this invention, either the constraining means extends into the swept volume of the crank mechanism or the restraining means so extends, or both may so extend.

Accordingly, in the first aspect, the present invention provides a scotch yoke fluid device which includes:

a crank including a big end having an axis which orbits about a main axis for the crank;

connecting means mounted on the big end axis;

at least one piston mounted for reciprocal motion in a cylinder along a piston axis, the piston having a cross-sectional area perpendicular to the piston axis, the piston having guide means including a linear surface transverse to the piston axis, the guide means engaging engagement means on the connecting means; and at least one restricting means for constraining the piston to move along the piston axis;

wherein the piston guide means bisects the piston cross-sectional area and at least part of each restricting means is located within a volume defined by the piston cross-sectional area projected along the piston axis, but is not located along the center line of the bisection formed by the piston guide means, characterised in that at least one of:

i) the at least one of the restricting means; and ii) a constraining means for the at least one of the restricting means always extends into a volume defined by the swept area of the crank projected along the main axis of the crank.

The contents of International Patent Application No. PCT/AU00/00281 are imported herein by reference. The variations of the invention disclosed in the imported specification may apply equally to the first aspect of the present invention.

Preferably, the restraining means fits into a groove or channel of the constraining means, which in turn is formed in or bolted to the crank case. The constraining means may comprise or include one or more rollers.

In this specification, when the restraining means or the constraining means is described as extending into the swept volume of the crank mechanism, it is to be understood that this includes the situation where the restraining means and/or the constraining means, as the case may be, meets the circumference of the swept volume of the crank mechanism, as well as when that circumference is crossed.

The invention disclosed in the specification imported herein by reference, above, is capable, in some embodiments, of variable compression. It is within the scope of this invention that the constraining means may be relocatable to accommodate the variable compression embodiment. For example, the constraining means may be adapted to be unbolted from the crank case and relocated in a more appropriate position on the crank case.

It will also be appreciated that, while this aspect of the invention has been illustrated with regard to a fluid device having a single piston, it is anticipated that this aspect of the invention may be applicable to multi-piston fluid devices.

In the second aspect of the present invention, to the various types of fiber structure disclosed in the US specifications, it is proposed to add non-aligned material, such as carbon, to aligned material and/or to add chopped strand tape. These may be mixed into the resin. The addition of chopped stands may provide compression load strength in addition to the previously-disclosed advantages. This can reduce the possibility of the composite bursting under pressure.

The second aspect of the invention relates to components, especially pistons, connecting means, restraining means, constraining means and combined pistons and connecting means. Such components may be suitable for any type of scotch yoke device, including but not limited to those disclosed in PCT/AU00/00281.

The components may be made of any of the materials disclosed in the US specifications referred to above and may optionally include non-aligned material and/or chopped strand tape.

The invention includes various novel methods of making such components. Specific examples of these are given in connection with the description relating to the drawings, below. As will be appreciated by a man skilled in the art, each of these specific examples can be extrapolated to a general method of manufacture and the invention covers these extrapolations.

The second aspect of the present invention is suitable for the application of pultrusion, an automatic method of producing continuing fiber reinforced shapes in large volumes. The process of pultrusion is known in the art.

Using pultrusion, and incorporating it in the second aspect of this invention, it is feasible to make pistons end to end, like a chain of sausages, the pistons being severed one from the other at the final stage of manufacture. In this embodiment, the fiber strands may be pulled along through the die mould prior to injection of resin, so that the fiber sods are oriented in the desired direction.

In another embodiment, the fibers used are chosen from, but not limited to, the following list: Kevlar, carbon, copper strands, glass, plastic, aramids or combinations of various fibers or any other suitable reinforcing material, the strands being held together in any suitable way. Preferably, the strands are pre-stressed then impregnated with resin. The resin used may be any suitable material known to the art. Fiber reinforced aluminum, particularly carbon fiber reinforced aluminum, can be manufactured so as to be lighter than aluminum alloy.

BRIEF DESCRIPTION OF THE DRAWINGS

The invention in its aspects will be now described in connection with certain non limiting preferred embodiments thereof, described in connection with the drawings, in which.

BEST MODE OF CARRYING OUT THE INVENTION

Figure 1:
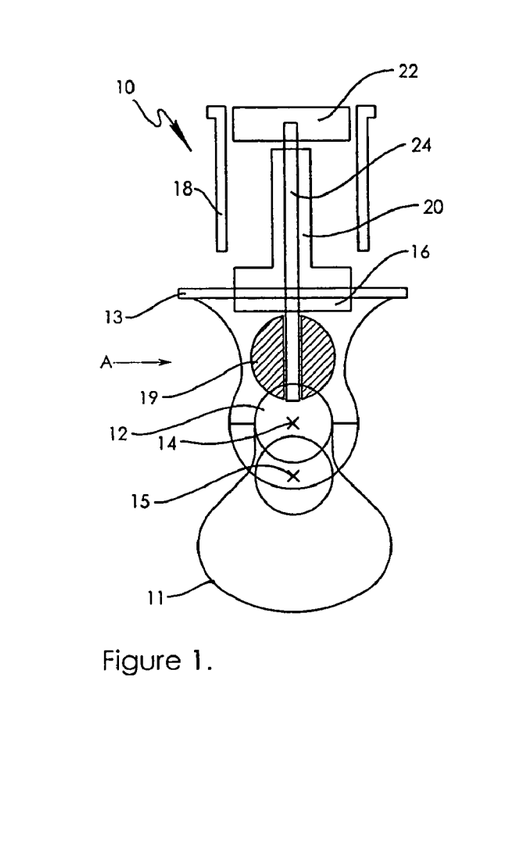
FIG. 1 is a sectional side elevation of an embodiment of a fluid engine device according to the first aspect of the invention.
Figure 2:
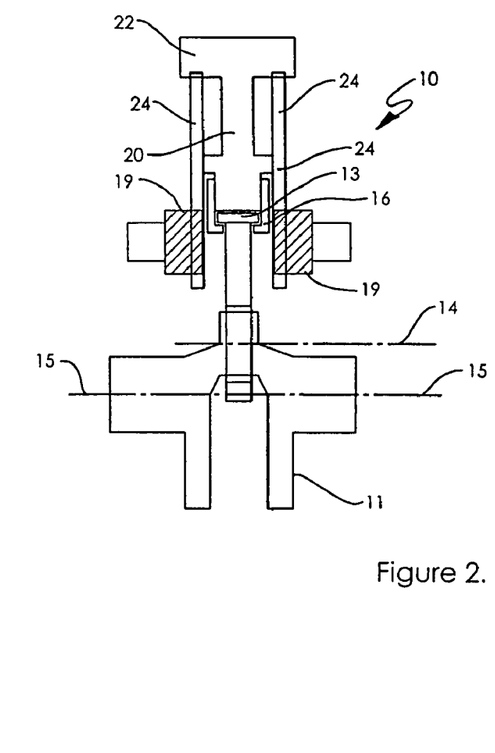
FIG. 2 is a view of the device of FIG. 1, looking in the direction of arrow A.

In FIGS. 1 and 2, fluid device 10 has a crank mechanism 11 including a big end bearing 12. Big end bearing 12 orbits about main axis 15 and has a big end axis 14. Rotatably mounted on big end bearing 12 is connecting means 13 which is engaged by first piston guide means 16.

Piston 22 is mounted for reciprocal motion in cylinder 18 (refer FIG. 1). Piston 22 includes intermediate means 20 to which piston guide means 16 are attached.

The restraining means are shown at 24 and can be see from FIG. 2. These extend into the swept volume of crank mechanism 11, even when piston 22 is at top dead center as shown in FIGS. 1 and 2.

Restraining means 24 are constrained by constraining means 19 which, as illustrated, may also extend into the swept volume of crank mechanism 11.

Constraining means 19 may of course be of a different configuration so as to provide more extensive engagement of second piston guide means 24.

Constraining means 19 are conveniently bolted to the crank case (not shown).

Figure 3:
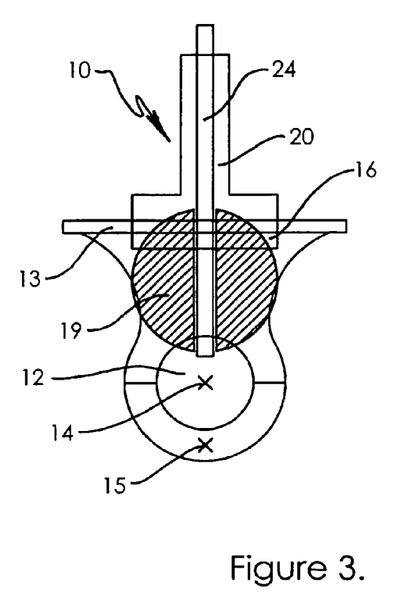
FIG. 3 is a variation of the embodiment of FIG. 1.

As can be seen from FIG. 3, constraining means 19 can be of a larger dimension compared to that in FIGS. 1 and 2.

Figure 4:
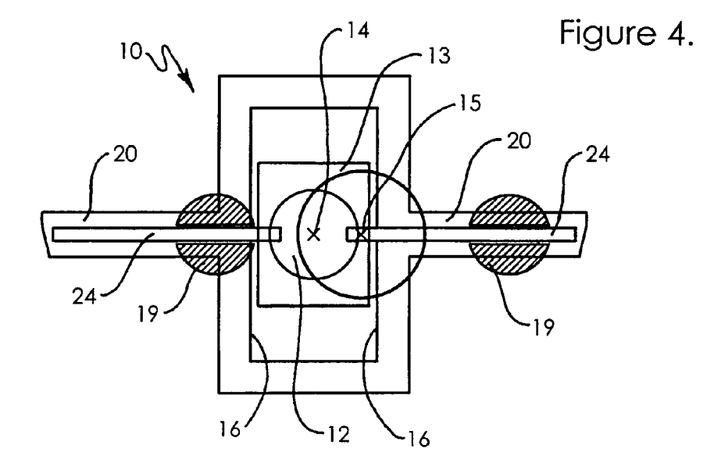
FIG. 4 is a further embodiment of the first aspect of the invention, showing a sectional side elevation of a second embodiment—"a boxer" type device.

With reference to FIG. 4, while this shows an alternative embodiment, the basic intention is the same as that shown in the preceding figures. The constraining means 19, in the case of each of the opposed pistons shown, extends into the swept volume of the crank. It will be appreciated that, in the embodiment shown in FIG. 4, the piston at the left hand side is shown at top dead center while the piston at the right hand side is shown at bottom dead center.

Figure 3A:
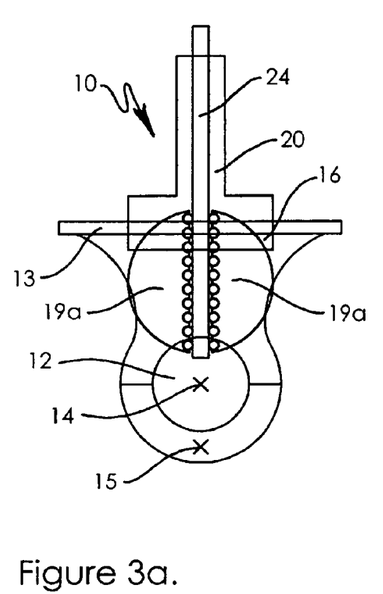
FIG. 3a is an alternative embodiment of the first aspect of the invention to that shown in FIG. 3.

With reference to FIG. 3a, there is shown an embodiment similar to the embodiment shown in FIGS. 3 and 4, except that rollers 19a on the constraining means 19 are adapted for rolling engagement with the restraining means 24.

Reference is now made to the second aspect of the invention and to the remaining figures.

As a preliminary, the contents of U.S. Pat. No. 6,524,707 are imported herein by reference. This specification discloses friction materials which can be used in connection with this second aspect of the invention, particularly as coatings or as component parts.

In the Figures, for ease of reference similar parts will be given the same reference numerals. It is anticipated that for most applications all of the parts illustrated may be made from carbon-carbon or other fiber composites.

Figures 5, 6, 7, 8, 9:
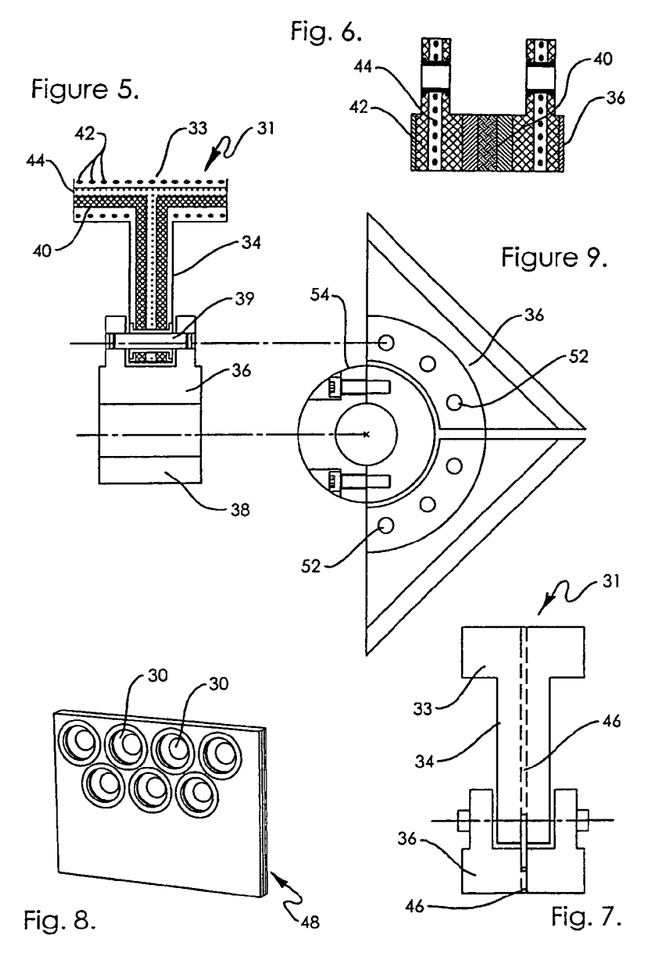
FIG. 5 is a side elevation of a connecting means made according to a first embodiment of the second aspect of the invention.
FIG. 6 is a side elevation of one of the components in FIG. 5.
FIG. 7 is a similar view to that of FIG. 5, but showing the connecting means having a passage for oil or other fluid.
FIG. 8 shows how components may be formed from a composite billet of carbon-carbon or other fiber.
FIG. 9 is a view in a plane 90 degrees to the view of FIG. 5.
Figure 10:
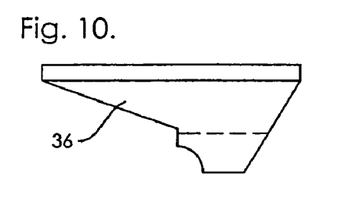
FIG. 10 shows a component of FIG. 11, which represents a variation of FIG. 9.

Referring to FIG. 5, connecting means 31 has engagement surface 33 and connection means 34, which in turn is joined to connection means 36. In this embodiment, connection means 34 is joined to connection means 36 via bolt 39. Connecting means 31 and connection means 34 are made in one piece from carbon-carbon composite. A mixture of fiber types is used As can be seen from the Figure, long strands 40 lie in the plane of the drawing. Other long strands 42 are perpendicular to the plane of the drawing. Mixed chopped strands 44 are also shown. This configuration is also shown in FIG. 6, which is a cross sectional view of connection means 36 in FIG. 5.

As shown in FIG. 7, the components may include a passage 46 for oil or other fluid.

Pistons 30 may be cut out of a billet 48 of suitably layered material, with pistons 30 being carved out in any suitable way (refer FIG. 8). The caring out may be carried out by any suitable method, including sawing, laser cutting, pressure cutting, projectile cutting, etc.

Turning now to FIG. 9, which shows a cross sectional side view of connection means 36 in FIG. 5, it can be seen that connection means 36 is, made in two annexed parts.

Figure 11:
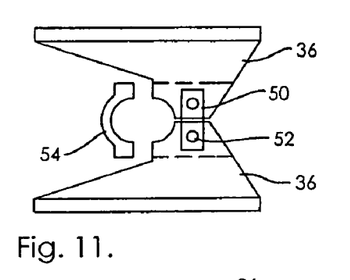
Figure 12:
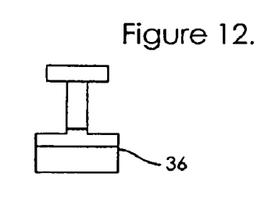
FIG. 12 is a side view of the element of 10.
Figure 13:
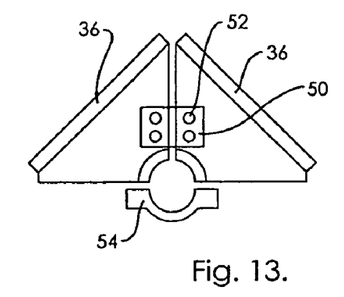
FIG. 13 is a further variation of the embodiment in FIG. 9.
Figure 14:
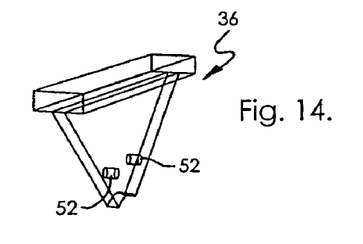
FIG. 14 is a perspective view of an element similar to that in FIGS. 9 to 13.

Referring now to FIG. 9, it will be appreciated that this component 36 can be carved out of a slab billet. The components 36 may be joined together in any suitable way, such as shown in FIG. 9 or by using a joining plate 50 which may contain two pins 52 as in FIG. 11 or four such pins as in FIG. 13. Six such pins are shown in FIG. 9. Big end cap 54 is shaped suitably in each case. Big end cap 54 may be made of the carbon-carbon or other fiber material, as can the other components, including connection means 36.

Figure 15:
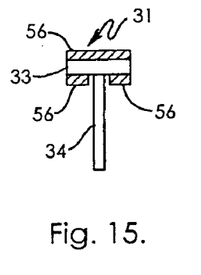
FIGS. 15, 16 and 17 illustrate the addition of being surfaces to components made from carbon-carbon or other fiber.
Figure 16:
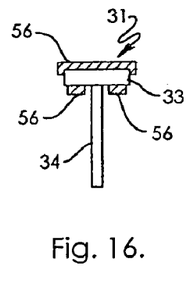
Figure 17:
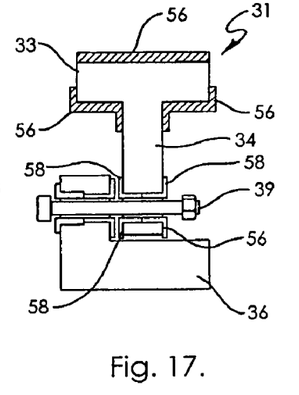

Turning now to FIGS. 15, 16 and 17, these Figures illustrating the addition of different bearing surfaces to engagement surface 33 and, in the case of FIG. 17, to part of connection means 34. In FIG. 15, bean surfaces 56 are attached to the upper and lower parts of engagement surface 33 and will provide for tensile and compressive thrust. In FIG. 16, bearing surfaces 56 also extend part way down the sides of engagement surface 33, thus allowing for side thrust also. This is similarly the case with the FIG. 17 embodiment. In addition, in the case of the FIG. 17 embodiment, further bearing surfaces 58 are fitted as shown in two pieces in each case on connection means 34 so as to provide bearing surfaces for a bolt 39. Bearing surfaces 58 can be riveted on, for example.

In each of FIGS. 15 to 17, the bearing surfaces may be glued on and may be metal, carbon-carbon fiber or other material. Bearing surfaces 58 preferably dove tail or otherwise fit together to provide a smooth bearing surface.

Figure 18:
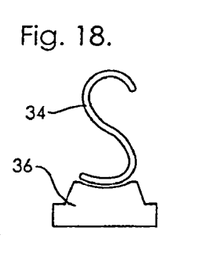
FIGS. 18, 19, 20, 21, 22 and 23 are different alternatives to the embodiment in FIG. 5.
Figure 19:
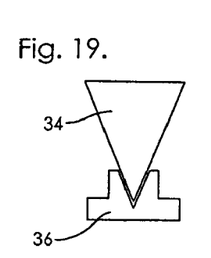
Figure 20:
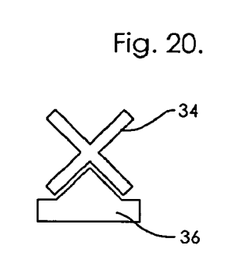

FIGS. 18 to 20 show connection means 34 in various configurations, in each case bonded or otherwise joined to connection means 36.

Figure 21:
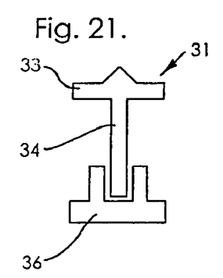
Figure 22:
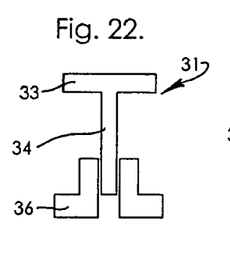
Figure 23:
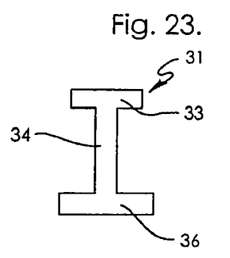

In FIGS. 21, 22 and 23, engagement surfaces 33 are shown joined to connection means 34. In the case of the embodiments in FIGS. 21 and 22, connection means 34 are joined to connection means 36 which may be in one piece (FIG. 21) or two pieces (FIG. 22). However, in FIG. 23, connection means 34 is integral with connection means 36.

Figures 24, 25, 26, 27:
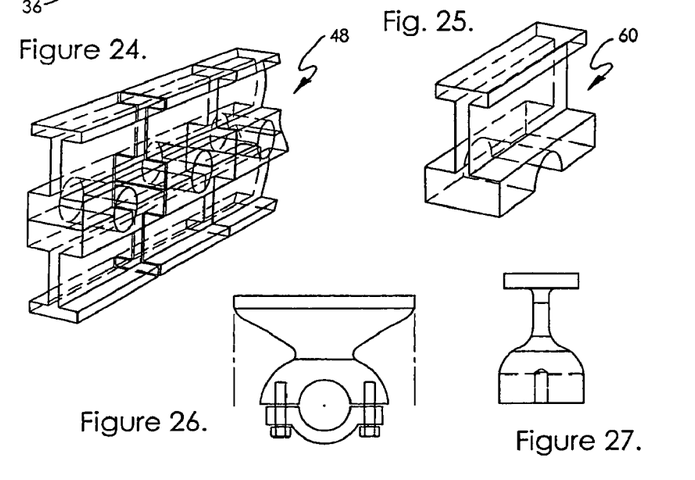
FIG. 24 is a perspective view, showing a formed composite billet and indicating how different components may be carved out of the billet.
FIG. 25 shows one of the carved out components from FIG. 24.
FIG. 26 is a side view of a component similar to that in FIG. 25.
FIG. 27 is an end view of the component of FIG. 26.
Figure 28:
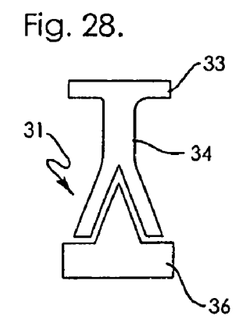
FIGS. 28 to 36 are further embodiments, alternative to that in FIG. 5.
Figure 29:
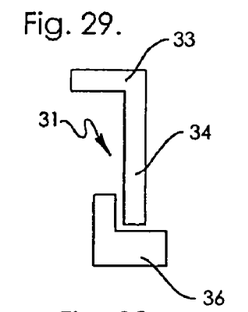
Figure 30:
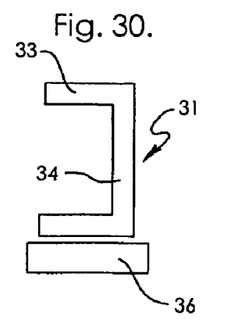
Figures 31, 32, 33, 34, 35, 36, 37:
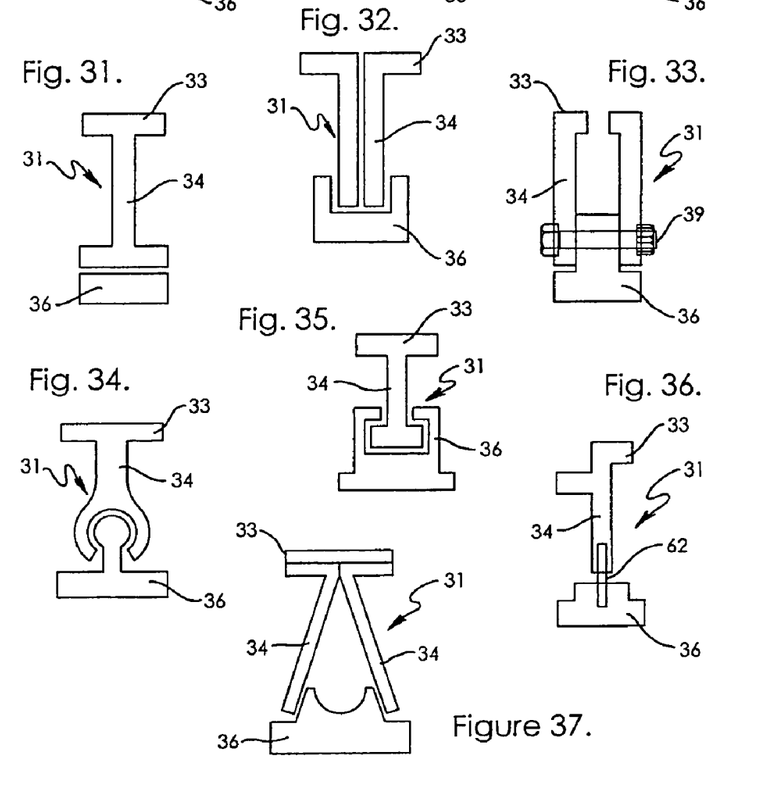
FIG. 37 illustrates yet another embodiment of the connecting means according to the present invention.

Turning now to FIG. 24, there is shown billet 48 in this case molded into a particular cross sectional shape which can be carved out to result in component 60 as shown in FIG. 25. In a similar way, the components in FIGS. 26 and 27 can be carved out of a suitably shaped billet 48.

With reference to FIGS. 28 to 37, these show various different embodiments of connecting means 31, in each case having engagement surface 33, connection rod 34, and connection means 36. In the FIG. 32 embodiment, for example, the component parts forming surface 33 and rod 34 may be glued or bolted together. In the FIG. 36 embodiment, rod 34 is jointed to connection means 36 by post 62. In the FIG. 37 embodiment, surface 33 is laminated, laminations being glued together and rod 34 is hollow internally, to result in a lighter component having greater struck strength.

Figure 38:
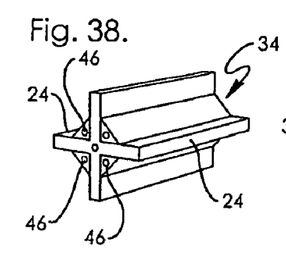
FIG. 38 is a perspective view of a connecting means or connecting rod which in this case can combine restraining guide means.

In the embodiment in FIG. 38, it will be noted that the embodiment includes oil passages 46. Alternately, these can represent reinforcement, such as bolts extending the length of the rod 34. It will also be noted that in this case the rod 34 can include restring means 24.

Figure 39:
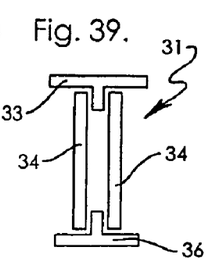
FIG. 39 is another version of a piston and connecting means.

FIG. 39 is a fierier embodiment of connecting means 31 and is self-explanatory.

Figures 40, 41, 42, 44, 45, 46, 47:
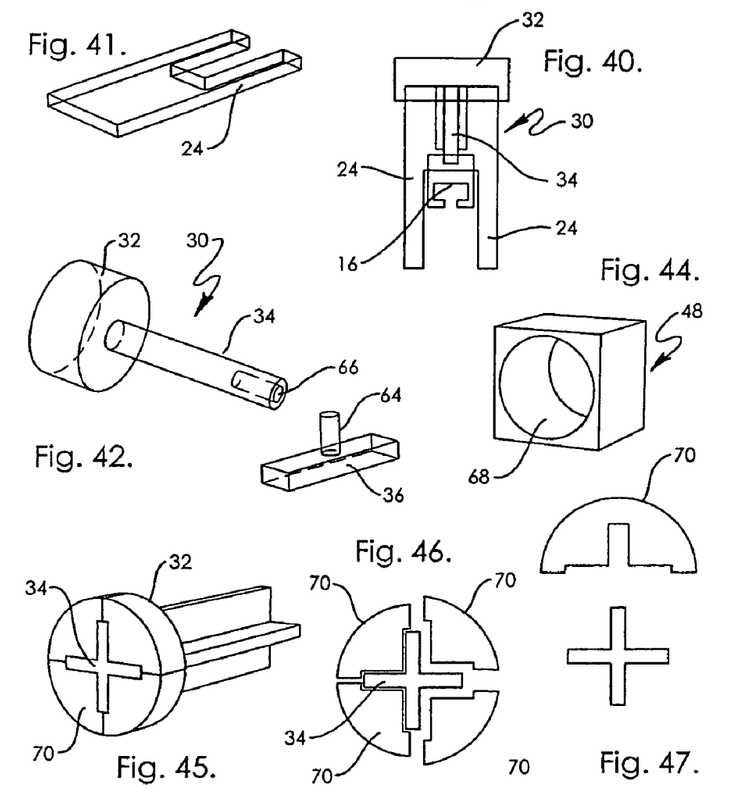
FIG. 40 is a further version of a piston incorporating first and second piston guide means.
FIG. 41 is a representation of one of the parts in FIG. 40.
FIG. 42 shows a version of a cylinder head, connecting rod and first piston guide means (slider) shown in two pieces.
FIG. 44 shows a carbon-carbon or other fiber billet after a piston head, such as that shown in FIG. 42, has been carved out.
FIG. 45 shows, assembled, a piston head and connecting means made up of several pieces, some of which are shown in FIG. 46.
FIG. 46 illustrates another view of the piston head according to another embodiment of the present invention.
FIG. 47 shows an alternate way of making the piston head of FIG. 46.
Figure 43:
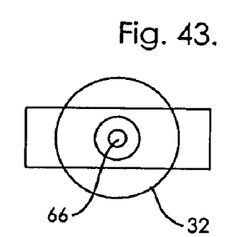
FIG. 43 is a top view of the embodiment in FIG. 42, assembled.

Piston 30 is FIG. 40 includes restraining guide means 24 and piston guide means 16.

Restraining means 24 can be made as shown in FIG. 41.

In FIG. 42 there is shown piston 30 which can be made integrally with rod 34 or separately from it. Connection means 36 is manufactured with extension 60 adapted to fit into cavity 66.

Figures 48, 49, 50, 51, 52, 53, 54, 55, 56, 57, 58, 59:
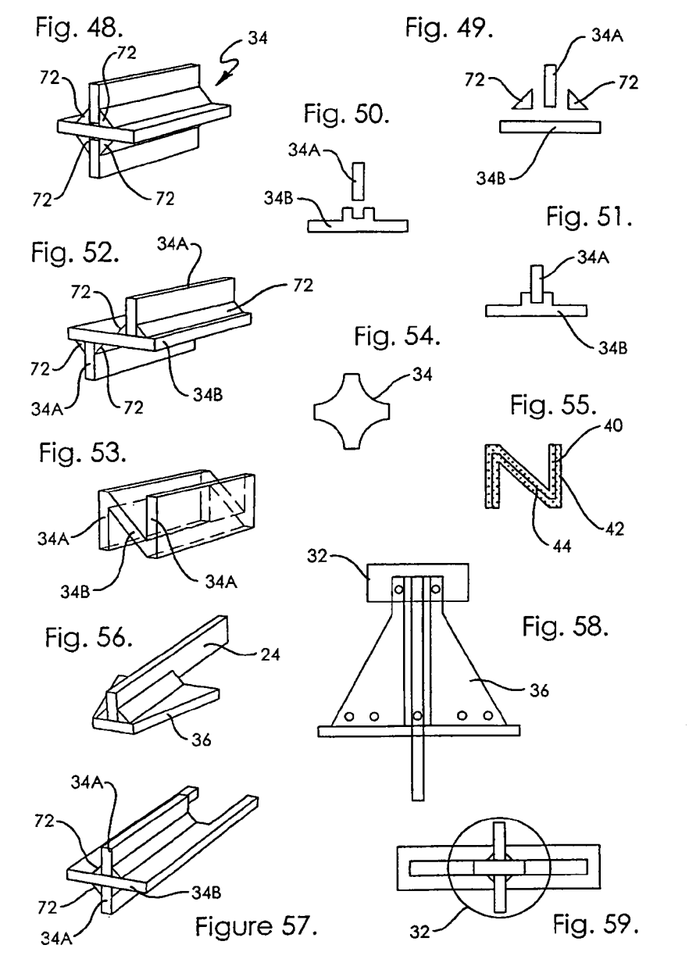
FIG. 48 is a view of a connecting means varying slightly from that in FIG. 38.
FIGS. 49, 50 and 51 show (in part) different ways of joining the embodiment in FIG. 48.
FIGS. 52 and 53 are alternate embodiments for the connecting means of FIG. 49.
FIG. 54 is an end view of a solid extruded connecting rod.
FIG. 55 is an end view of the embodiment in FIG. 53, showing a particular orientation of fiber.
FIG. 56 is an alternate embodiment (in part) to that of FIG. 40.
FIG. 57 is another embodiment of the connecting means of FIG. 48, but being differently shaped on the end remote from the piston head.
FIG. 58 is another embodiment of the arrangement in FIG. 5.
FIG. 59 is a top view of the embodiment in FIG. 58.

In FIG. 49, billet 48 has had carved out of it piston head 32, leaving a cavity 68.

Turning now to FIGS. 45 and 46, head 32 is made of four parts 70. (Of course, there could be more or less parts than four). These are fitted into cross-shaped connecting rod 34. An alternative as shown in FIG. 47 is for parts 70 to be made in halves, rather in quarters as shown in FIGS. 45 and 46.

The embodiment in FIG. 48 shows connection rod 34 being strengthened by pieces 72, each of which may be cut out of a flat carbon-carbon composite sheet, trimmed and glued into place.

In FIGS. 49 to 51, the component parts of connection rod 34 are shown in totality, or as one half of the connecting rod 34, in each case the drawing being repeated and mirror reversed to provide the other half. Thus connection rod 34 is made up of components 34a and 34b, with the optional omission of pieces 72.

Different configurations are shown in FIGS. 52 and 53, which are self-explanatory, as is FIG. 54.

As shown in FIG. 55, the connecting rod in FIG. 53 can be made up of strands 40, 42 and 44. (Any of 40, 42 and 44 may be used, separately or in combination).

If desired, the embodiment in FIGS. 53 and 55 may be cut out of a single sheet in one piece.

The embodiments in FIGS. 56 to 59 are self-explanatory.

Figure 60:
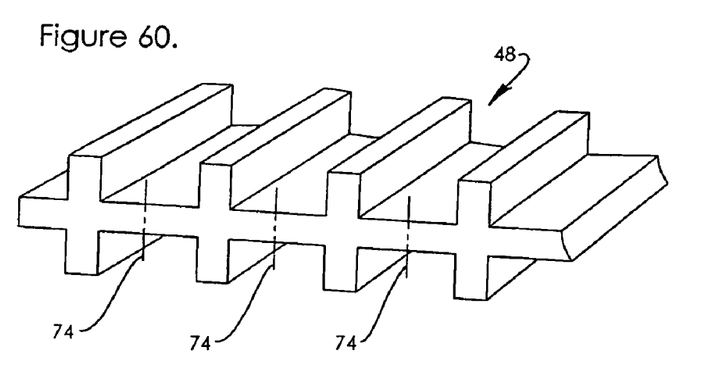
FIG. 60 is a perspective view of a billet from which connecting means such as those in FIG. 48 may be cut.
Figure 61:
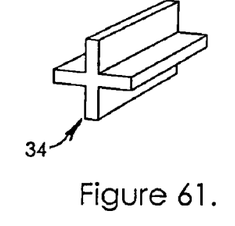
FIG. 61 shows a connecting means cut from the sheet of FIG. 60.

Turning now to FIG. 60, billet 48 may be cut to form connecting rods 34 as shown in FIG. 61 by slicing at cut lines 74.

Figure 62:
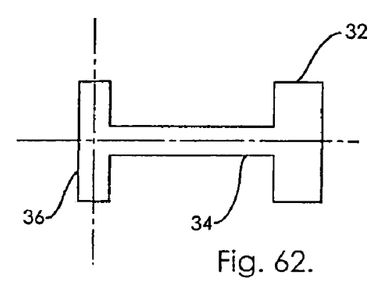
FIG. 62 shows a different version of an element cut from a sheet like FIG. 60.
Figure 63:
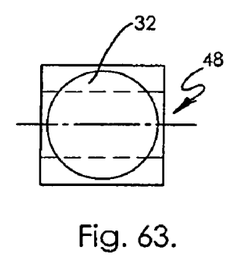
FIG. 63 shows in end view a sheet or billet before the element of FIG. 62 (which includes a piston head) is cut out.

FIGS. 62 and 63 are self-explanatory.

Figure 64:
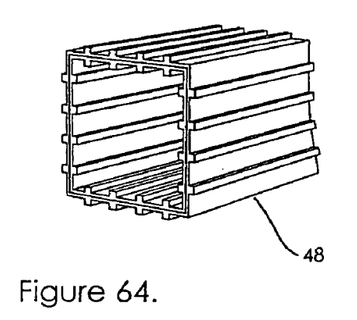
FIG. 64 shows how a sheet or billet like that of FIG. 60 may be manufactured in a tube form instead of "flat"

FIG. 64 shows a billet 48 similar to that in FIG. 60, except that instead of a "flat" sheet, a tube is formed.

In FIGS. 65 to 69, billet 48 is cut—as shown in some cases, along cut lines 74 to form suitably-shaped elements. For example, in FIG. 69 the solid cylinder can be cut to form piston heads 32.

Figures 65, 66, 67, 68, 69, 70, 71, 72, 73, 74:
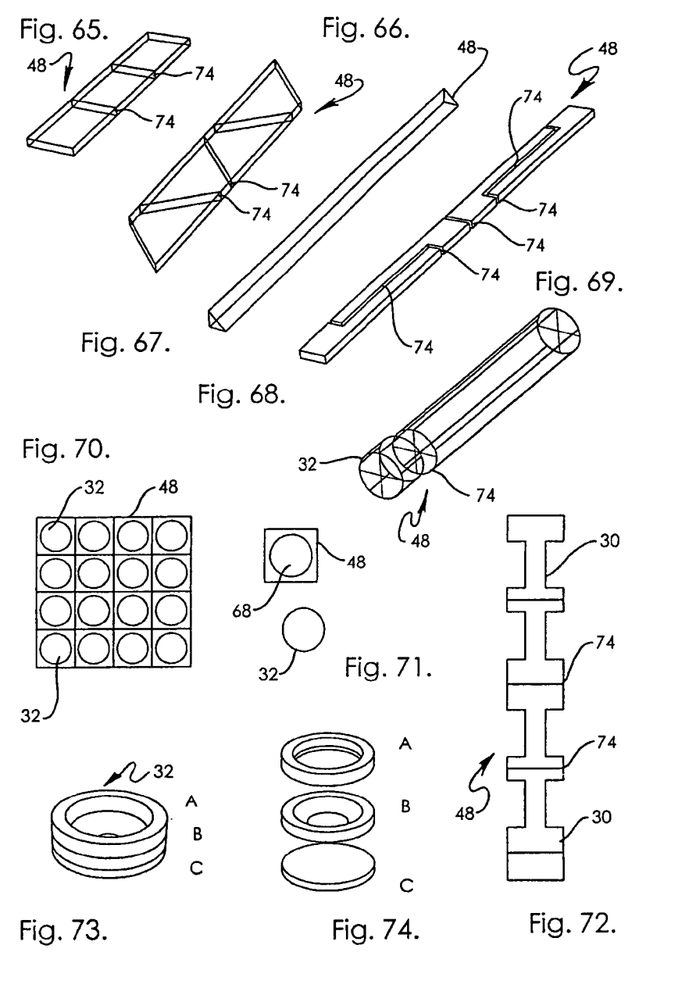
FIGS. 65, 66, 67 and 68 show different ways of cutting up sheets or billets to form components of the second aspect of the invention.
FIG. 69 shows in perspective view a solid cylinder of carbon-carbon or other material and shows has piston heads may be cut out.
FIG. 70 shows an alternate way of cutting cylinder heads out of a billet and represents an alternate to the illustration in FIG. 8.
FIG. 71 shows a cylinder head having been cut out of a carved out square of the billet of FIG. 70.
FIG. 72 shows a "chain" of pistons prior to cutting out of a continuous billet.
FIG. 73 shows a perspective view of a piston head made up of a series of laminations.
FIG. 74 is the piston head of FIG. 73 in exploded form.

FIG. 70 is somewhat similar to the illustration in FIG. 8, except that in this case billet 48 has cut out of it in a grid pattern piston heads 32.

FIG. 72 is self-explanatory.

Figure 75:
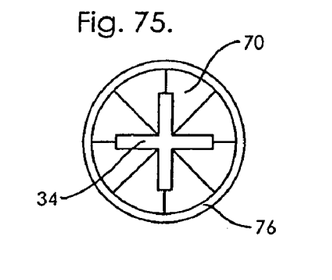
FIG. 75 is an end view of a piston bead similar to that in FIG. 46.

In the embodiment of piston head 34 shown in FIGS. 73 and 75, the piston head is made of thee different laminates A, B and C, which are bonded together by suitable means.

Figure 76:
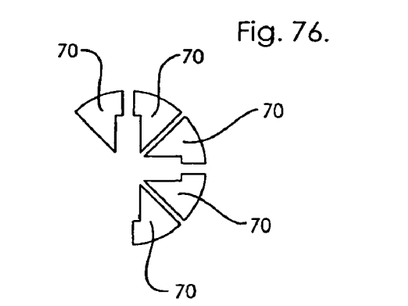
FIG. 76 shows some of the components of FIG. 75.

FIGS. 75 and 76 represent a development of the piston in FIGS. 45 and 46, except in the case of FIGS. 75 and 76 there are six parts 70 of head 32. Further, head 32 is wrapped by tape 76.

Figures 77, 78, 79, 80:
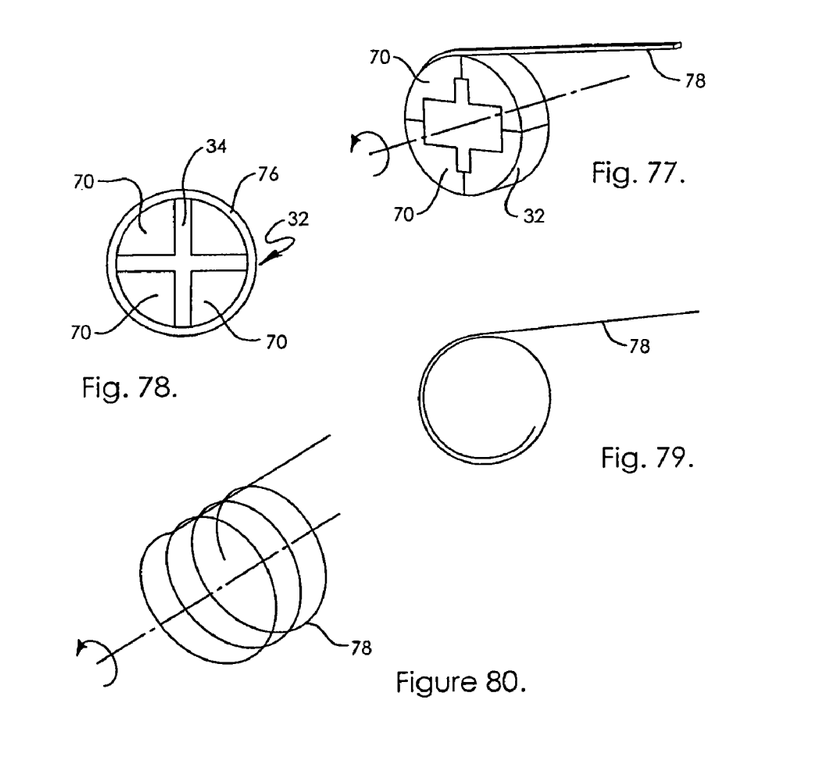
FIG. 77 illustrates an embodiment of a method of wrapping fiber tape around a piston head, such as that in FIG. 45.
FIG. 78 shows an alternative wrapped piston head.
FIG. 79 shows the wrapping of the fiber tape without picturing the piston head, for ease of illustration.
FIG. 80 is a diagrammatic view of the wrapping procedure in FIG. 79 after several turns have been made.
Figure 81:
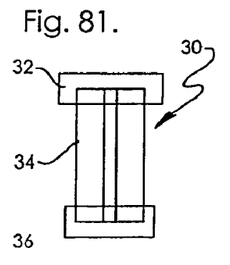
FIG. 81 is a further embodiment of a piston, alternative to that in FIG. 5.
Figure 82:
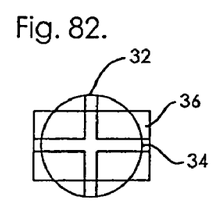
FIG. 82 is a plan view of the piston of FIG. 81.

FIG. 78 shows a simplified version of a wrapped piston head 32. To wrap piston head 32, a strand of fiber tape 80 is wound around part 70 of head 32 as shown in FIGS. 77, 79 and 80.

FIGS. 81 to 85 are self-explanatory.

Figure 83:
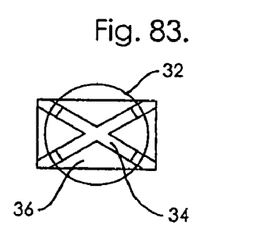
FIGS. 83, 84 and 85 are alternate versions of the piston of FIG. 82.
Figure 84:
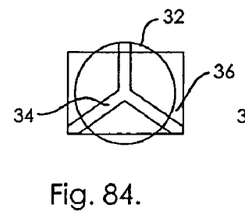
Figure 85:
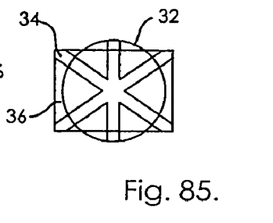
Figures 86, 87, 88, 89, 90, 91:
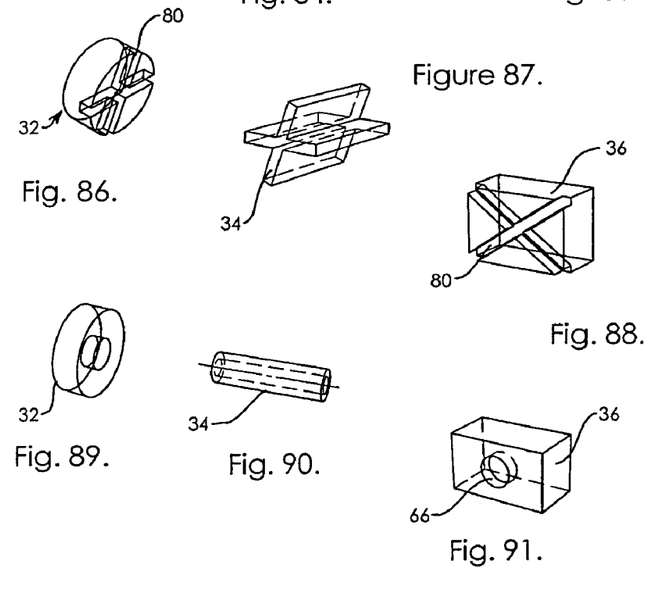
FIGS. 86, 87 and 88 show a piston head, connection means and connecting means, respectively, adapted to the slotted together.
FIGS. 89, 90 and 91 show corresponding components in a different configuration.

FIGS. 86, 87 and 88 show in detail how an embodiment such as that in FIG. 83 may be slotted together with suitable grooves 80 in piston head 84 and connection means 36. Similarly, FIGS. 89, 90 and 91 show the fitting together of the piston components similarly to those in FIG. 42.

INDUSTRIAL APPLICABILITY

The present invention takes the invention disclosed in PCT/AU00/00281 and further improves it both in relation to the configuration of the restricting means and/or constraining means and in relation to the composition of the components, especially combined pistons/connecting means. The present invention enhances the existing industrial applicability of the invention in PCT/AU00/00281. It also makes advances in the manufacture of scotch yoke device components generally.

What is claimed is:

1. A scotch yoke fluid device which includes:
a crank including a big end having an axis which orbits about a main axis for the crank;
connecting means mounted on the big end axis;
at least one piston mounted for reciprocal motion in a cylinder along a piston axis, the piston having a cross-sectional area perpendicular to the piston axis, the piston having guide means including a linear surface transverse to the piston axis, the guide means engaging engagement means on the connecting means; and
at least one restraining means for constraining the piston to move along the piston axis;
wherein the piston guide means bisects the piston cross-sectional area and at least part of each restraining means is located within a volume defined by the piston cross-sectional area projected along the piston axis, but is not located along the center line of the bisection formed by the piston guide means,
characterised in that at least one of:
i) the or at least one of the restraining means; and
ii) a constraining means for the or at least one of the restraining means always extends into a volume defined by the swept area of the crank projected along the main axis of the crank projected along the main axis of the crank;
wherein the constraining means comprises one or more rollers.

2. A scotch yoke fluid device which includes:
a crank including a big end having an axis which orbits about a main axis for the crank;
connecting means mounted on the big end axis;
at least one piston mounted for reciprocal motion in a cylinder along a piston axis, the piston having a cross-sectional area perpendicular to the piston axis, the piston having guide means including a linear surface transverse to the piston axis, the guide means engaging engagement means on the connecting means; and
at least one restraining means for constraining the piston to move along the piston axis;
wherein the piston guide means bisects the piston cross-sectional area and at least part of each restraining means is located within a volume defined by the piston cross-sectional area projected along the piston axis, but is not located along the center line of the bisection formed by the piston guide means,
characterised in that at least one of:
i) the or at least one of the restraining means; and
ii) a constraining means for the or at least one of the restraining means always extends into a volume defined by the swept area of the crank projected along the main axis of the crank projected along the main axis of the crank;
wherein the or at least one piston is combined with the connecting means.

3. The fluid device of claim 2, wherein the combined piston and connecting means is composed of a fiber composite.

4. The fluid device of claim 3, wherein the fiber composite includes non-aligned material and/or chopped strand tape.

5. The fluid device of claim 4, wherein the non-aligned material and/or chopped strand tape is mixed with aligned material into a resin.

6. The fluid device of claim 3, wherein the fiber composite is a carbon-carbon composite or a composite using fibers chosen from the group: Kevlar carbon, copper strands, glass, plastic or a combination of two or more of the foregoing.

7. The fluid device of claim 3, wherein the fiber composite also includes metal.

8. The fluid device of claim 7, wherein the metal is aluminum.

9. A scotch yoke fluid device which includes:
a crank including a big end having an axis which orbits about a main axis for the crank;
connecting means mounted on the big end axis;
at least one piston mounted for reciprocal motion in a cylinder along a piston axis, the piston having a cross-sectional area perpendicular to the piston axis, the piston having guide means including a linear surface transverse to the piston axis, the guide means engaging engagement means on the connecting means; and
at least one restraining means for constraining the piston to move along the piston axis;
wherein the piston guide means bisects the piston cross-sectional area and at least part of each restraining means is located within a volume defined by the piston cross-sectional area projected along the piston axis, but is not located along the center line of the bisection formed by the piston guide means,
characterised in that the at least one piston is combined with the connecting means.

10. The fluid device of claim 9, wherein the combined piston and connecting means is composed of a fiber composite.

11. The fluid device of claim 10, wherein the fiber composite includes non-aligned material and/or chopped strand tape.

12. The fluid device of claim 11, wherein the non-aligned material and/or chopped strand tape is mixed with aligned material into a resin.

13. The fluid device of claim 10, wherein the fiber composite is a carbon-carbon composite or a composite using the fibers chosen from the group: Kevlar carbon, copper strands, glass, plastic or a combination of two or more of the foregoing.

14. The fluid device of claim 10, when the fiber composition also includes metal.

15. The fluid device of claim 14, wherein the metal is aluminum.

16. A component suitable for a scotch yoke fluid device including the device of claim 9, the component being composed of a fiber composite.

* * * * *